(12) United States Patent
Takiya et al.

(10) Patent No.: US 10,464,448 B2
(45) Date of Patent: Nov. 5, 2019

(54) CONVEYANCE SEAT (71) Applicant: TOYOTA BOSHOKU KABUSHIKI KAISHA, Aichi (JP)

(72) Inventors: Koji Takiya, Aichi (JP); Masato Kuroda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 82 days.

(21) Appl. No.: 15/877,877

(22) Filed: Jan. 23, 2018

(65) Prior Publication Data
US 2018/0257518 A1    Sep. 13, 2018

(30) Foreign Application Priority Data

Mar. 8, 2017    (JP) ................................. 2017-043944

(51) Int. Cl.
*B60N 2/22*    (2006.01)
*B60N 2/20*    (2006.01)

(52) U.S. Cl.
CPC ............ *B60N 2/2227* (2013.01); *B60N 2/20* (2013.01)

(58) Field of Classification Search
CPC ........ B60N 2/206; B60N 2/20; B60N 2/2356; B60N 2/2227
USPC ......................................... 297/378.12, 367 R
See application file for complete search history.

(56) References Cited

U.S. PATENT DOCUMENTS

| 5,328,241 | A  | * | 7/1994 | Haider ................. | B60N 2/2352 297/366 |
| 5,540,117 | A  | * | 7/1996 | Hansel ..................... | B60N 2/20 297/367 R |
| 7,490,907 | B2 |   | 2/2009 | Nagura et al. | |
| 8,123,297 | B2 | * | 2/2012 | Quast ................... | B60N 2/2352 297/366 |
| 8,186,759 | B2 | * | 5/2012 | Vedder ..................... | B60N 2/20 297/367 R |
| 2006/0181131 | A1 | * | 8/2006 | Kienke ................ | B60N 2/2352 297/367 R |

(Continued)

FOREIGN PATENT DOCUMENTS

| DE | 10206299 B4 * | 5/2014 | ............... B60N 2/20 |
| JP | 2007-037888 | 2/2007 | |

*Primary Examiner* — Milton Nelson, Jr.
(74) *Attorney, Agent, or Firm* — Greenblum & Bernstein, P.L.C.

(57) ABSTRACT

A conveyance seat that can increase an engagement force between components in a walk-in mechanism is provided. The conveyance seat comprises a plate-like tilting member that transmits a pivoting force to a back frame and is pivotable relative to the back frame; a plate-like engagement member displaceable between an engaged position and a non-engaged position with the tilting member; and a plate-like locking member displaceable between a locked position and an unlocked position relative to the engagement member. The engagement member comprises projections including a slanted-projection having a first side wall in a frontward pivoting direction of the back frame. The tilting member comprises depressions engageable with the projections including a slanted-depression having a second side wall facing the first side wall. The first and second side walls are separated and each slant such that a lower end is situated more frontward in the pivoting direction than an upper end.

7 Claims, 7 Drawing Sheets (56) References Cited

U.S. PATENT DOCUMENTS

2006/0226687 A1* 10/2006 Leconte .................. B60N 2/235
                                                           297/367 R
2007/0040437 A1    2/2007 Nagura et al.

* cited by examiner

CONVEYANCE SEAT

CROSS-REFERENCE TO RELATED APPLICATIONS

This application claims the benefit of Japanese Patent Application No. 2017-043944 filed Mar. 8, 2017 in the Japan Patent Office, the entire disclosure of which is incorporated herein by reference.

BACKGROUND

The present disclosure relates to a conveyance seat.

A conveyance seat for conveyances such as vehicles comprises a reclining device to pivot a seatback relative to a seat cushion. In addition, a conveyance seat for, for example, a passenger seat in a passenger car and the second row in a three-row seater car comprises a walk-in mechanism that allows access to the rear side of the seatback by folding the seatback down (forward).

This walk-in mechanism releases engagement between an engagement member (so-called pawl) and a tilting member (so-called ratchet plate) to fold the seatback down further than a seatback-tilt by a reclining function (Japanese Unexamined Patent Application Publication 2007-037888).

SUMMARY

In the aforementioned walk-in mechanism, a weak engagement force between the pawl and the ratchet plate results in insufficient strength of the conveyance seat in a seat-mode. One possible method to increase the engagement force is to increase the number of engagement portions (for example, depressions and projections) in a predetermined area of the pawl and the ratchet plate. However, such an increase in the number of engagement portions affects manufacturing tolerances, which may result in creating gaps between components in an engaged state. These gaps may increase backlash in engagement when a large load is applied to the conveyance seat and disadvantageously decreases the engagement force.

The object in one aspect of the present disclosure is to provide a conveyance seat that can increase the engagement force between components in a walk-in mechanism.

One aspect of the present disclosure is a conveyance seat that comprises a seat cushion, and a seatback. The seatback is pivotable frontward and rearward relative to the seat cushion. The conveyance seat also comprises a cushion frame that is a frame of the seat cushion; a back frame that is a frame of the seatback; a tilting member having a plate-like shape; an engagement member having a plate-like shape; and a locking member having a plate-like shape. The back frame is coupled to the cushion frame to be pivotable frontward and rearward relative to the cushion frame. The tilting member transmits, to the back frame, a pivoting force for pivoting the back frame and is pivotable relative to the back frame about a pivot axis of the back frame. The engagement member is coupled to the back frame and displaceable between an engaged position, where the engagement member is engaged with the tilting member, and a non-engaged position, where the engagement of the engagement member with the tilting member is released. The locking member is displaceable between a locked position, where the engagement member is locked in the engaged position, and an unlocked position, where the engagement member is not locked in the engaged position. The engagement member comprises projections. The tilting member comprises depressions that are engageable with the projections. The projections include a slanted projection. The depressions include a slanted depression that engages with the slanted projection. The slanted projection comprises a first side wall situated in the frontward pivoting direction of the back frame. The slanted depression comprises a second side wall that faces the first side wall. The first side wall is separated from the second side wall when the engagement member is placed in the engaged position. Each of the first side wall and the second side wall comprises an upper end and a lower end. The upper end is situated farther from the pivot axis of the back frame than the lower end is. The first side wall and the second side wall each slants such that the lower end is situated more frontward than the upper end is in the frontward pivoting direction of the back frame.

According to this configuration, a clearance is created between the slanted projection and the slanted depression in the engaged position. When a pivoting force is applied to the back frame in the engaged state, this clearance causes the lower end of the first side wall of the slanted projection to enter the second side wall of the slanted depression, as if to penetrate (forcing a way) into the lower end of the second side wall that is near a bottom surface of the slanted depression. As a consequence, the slanted projection is subjected to a stress in a direction to prevent the slanted projection from becoming disengaged from the slanted depression. This results in increasing the engagement force between the engagement member and the tilting member.

In one aspect of the present disclosure, the engagement member may comprise a first engagement portion and a second engagement portion that are offset from each other along the pivot axis of the back frame. The projections may include a first projection, a second projection, a third projection, and a fourth projection. The depressions may include a first depression, a second depression, a third depression, and a fourth depression. The first engagement portion may comprise the first projection and the second projection. The second engagement portion may comprise the third projection and the fourth projection. In addition, the tilting member may comprise a first receiving member and a second receiving member. The first receiving member may comprise the first depression and the second depression that are respectively engageable with the first projection and the second projection. The second receiving member may comprise the third depression and the fourth depression that are respectively engageable with the third projection and the fourth projection. This configuration enables an increase in engagement points by engaging the engagement member with the tilting member at two points, namely the first engagement portion and the second engagement portion. Accordingly, the number of components can be reduced while enhancing the engagement force between the engagement member and the tilting member.

In one aspect of the present disclosure, the first engagement portion and the second engagement portion may each have a plate-like shape and may each be configured to be pivotable about an axis that is parallel to a pivot axis of the tilting member. In addition, the locking member may be configured to abut the first engagement portion in a pivoting direction of the locking member when the locking member is placed in the locked position. The first depression or the second depression of the first receiving member may be a tight-fit depression that is the most distant depression from a pivot axis of the first engagement portion. The first projection or the second projection of the first engagement portion may be a tight-fit projection that engages with the tight-fit depression. When the first engagement portion is placed in the engaged position, there may be no clearance between the tight-fit depression and the tight-fit projection in the pivoting direction of the back frame. Compared with other depressions and projections, the farthest depression and the farthest projection, which are situated most distant from the pivot axis of the first engagement member, are required to have highly controlled positioning and high accuracy in shaping in order to have the engagement member precisely locked with the locking member. The aforementioned configuration can minimize errors in designing these farthest depression and projection, and therefore can increase precision of engagement between the engagement member and the tilting member.

In one aspect of the present disclosure, the first engagement portion and the second engagement portion may each have a plate-like shape and may each be configured to be pivotable about an axis that is parallel to the pivot axis of the tilting member. A thickness of the first engagement portion may be greater than a thickness of the second engagement portion. The first depression or the second depression of the first receiving member may be a tight-fit depression that is the most distant depression from a pivot axis of the first engagement portion. The first projection or the second projection of the first engagement portion may be a tight-fit projection that engages with the tight-fit depression. When the first engagement portion is placed in the engaged position, there may be no clearance between the tight-fit depression and the tight-fit projection in the pivoting direction of the back frame. Due to being subjected to greater stress upon engagement than depressions and projections in other engagement member, the farthest depression and the farthest projection, situated most distant from the pivot axis of the engagement member, are required to have highly controlled positioning and high accuracy in shaping. The aforementioned configuration can minimize errors in designing these farthest depression and projection, and therefore can increase precision in engagement between the engagement member and the tilting member.

In one aspect of the present disclosure, the third depression and the fourth depression of the second receiving member may be situated closer to the pivot axis of the tilting member than the first depression and the second depression of the first receiving member. In addition, the third depression or the fourth depression of the second engagement portion may be the slanted projection. According to this configuration, a depression situated close to the pivot axis of the tilting member can comprise a mechanism to engage with the slanted projection as described above. This can promote an effect to enhance the engagement force.

In one aspect of the present disclosure, the first engagement portion and the second engagement portion may be collectively displaced. Since the first engagement portion and the second engagement portion simultaneously engage with the tilting member, this configuration helps to reduce differences in the degree of engagement, and consequently, can increase reliability of the walk-in mechanism.

In one aspect of the present disclosure, the engagement member may be configured to be pivotable about an axis that is parallel to the pivot axis of the tilting member. The depressions of the tilting member may include a tight-fit depression that is the most distant depression from a pivot axis of the engagement member. The projections of the engagement member may include a tight-fit projection that engages with the tight-fit depression. When the engagement member is placed in the engaged position, there may be no clearance between the tight-fit depression and the tight-fit projection in the pivoting direction of the back frame. The farthest depression and the farthest projection, situated most distant from the pivot axis of the engagement member, are the most likely components to be incorrectly positioned, and thus required to have highly controlled positioning and high accuracy in shaping. The aforementioned configuration can minimize errors in designing these farthest depression and projection and therefore can increase precision of engagement between the engagement member and the tilting member.

BRIEF DESCRIPTION OF THE DRAWINGS

Embodiments of the present disclosure will be described hereinafter by way of example with reference to the accompanying drawings, in which.

DETAILED DESCRIPTION OF THE PREFERRED EMBODIMENTS

1. First Embodiment

[1-1. Configuration]

Figure 1:
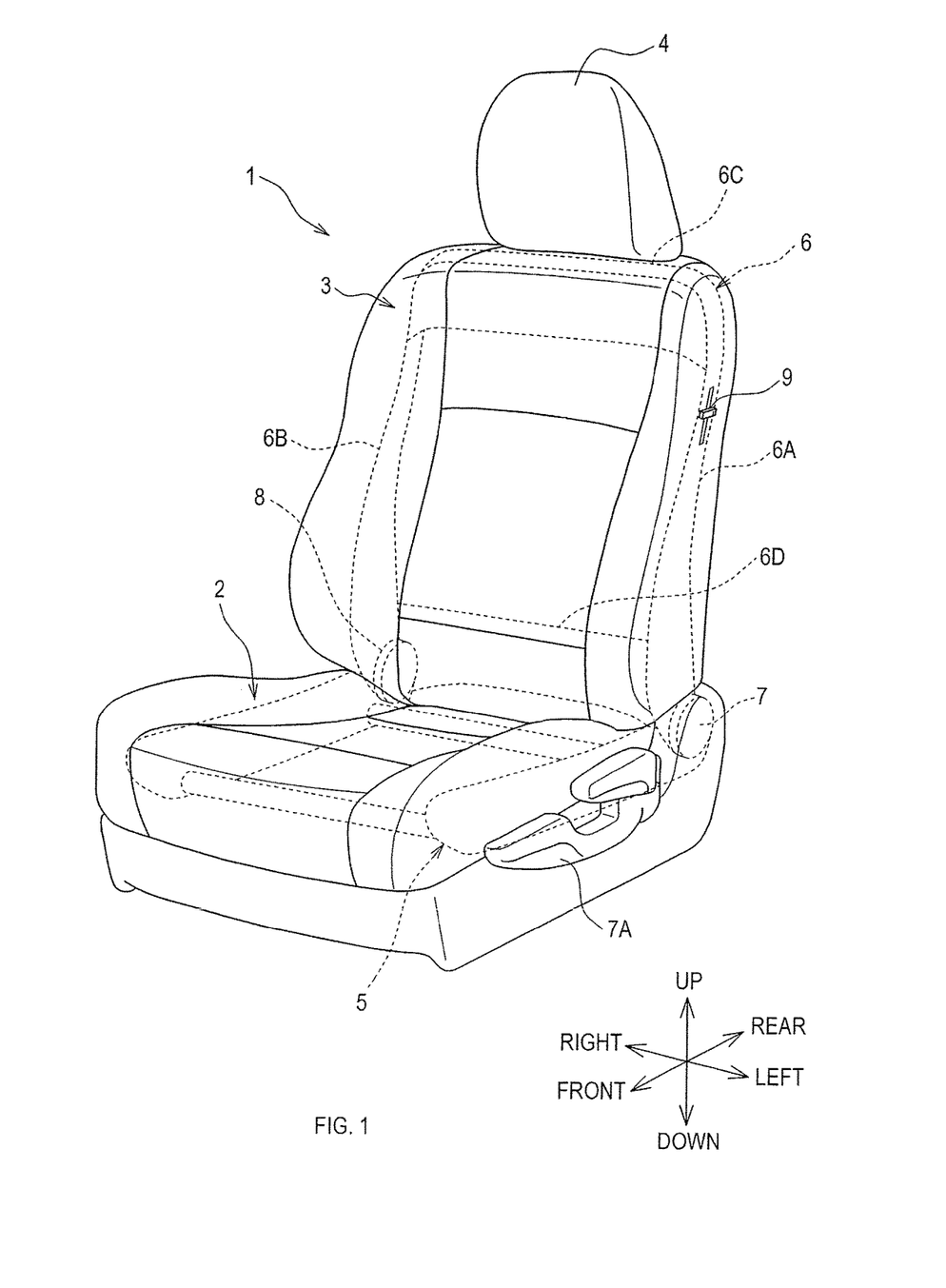
FIG. 1 is a schematic perspective view of a conveyance seat according to an embodiment.

A conveyance seat 1 shown in FIG. 1 comprises a seat cushion 2, a seatback 3, and a headrest 4.

The seat cushion 2 is for supporting the buttocks of an occupant. The seatback 3 is for supporting the back of the occupant and is pivotable frontward and rearward relative to the seat cushion 2. The headrest 4 is for supporting the head of the occupant.

The conveyance seat 1 also comprises a cushion frame 5 that is a frame of the seat cushion 2, and a back frame 6 that is a frame of the seatback 3. The back frame 6 is coupled to the cushion frame 5 and is configured to be pivotable frontward and rearward relative to the cushion frame 5.

Figure 2:
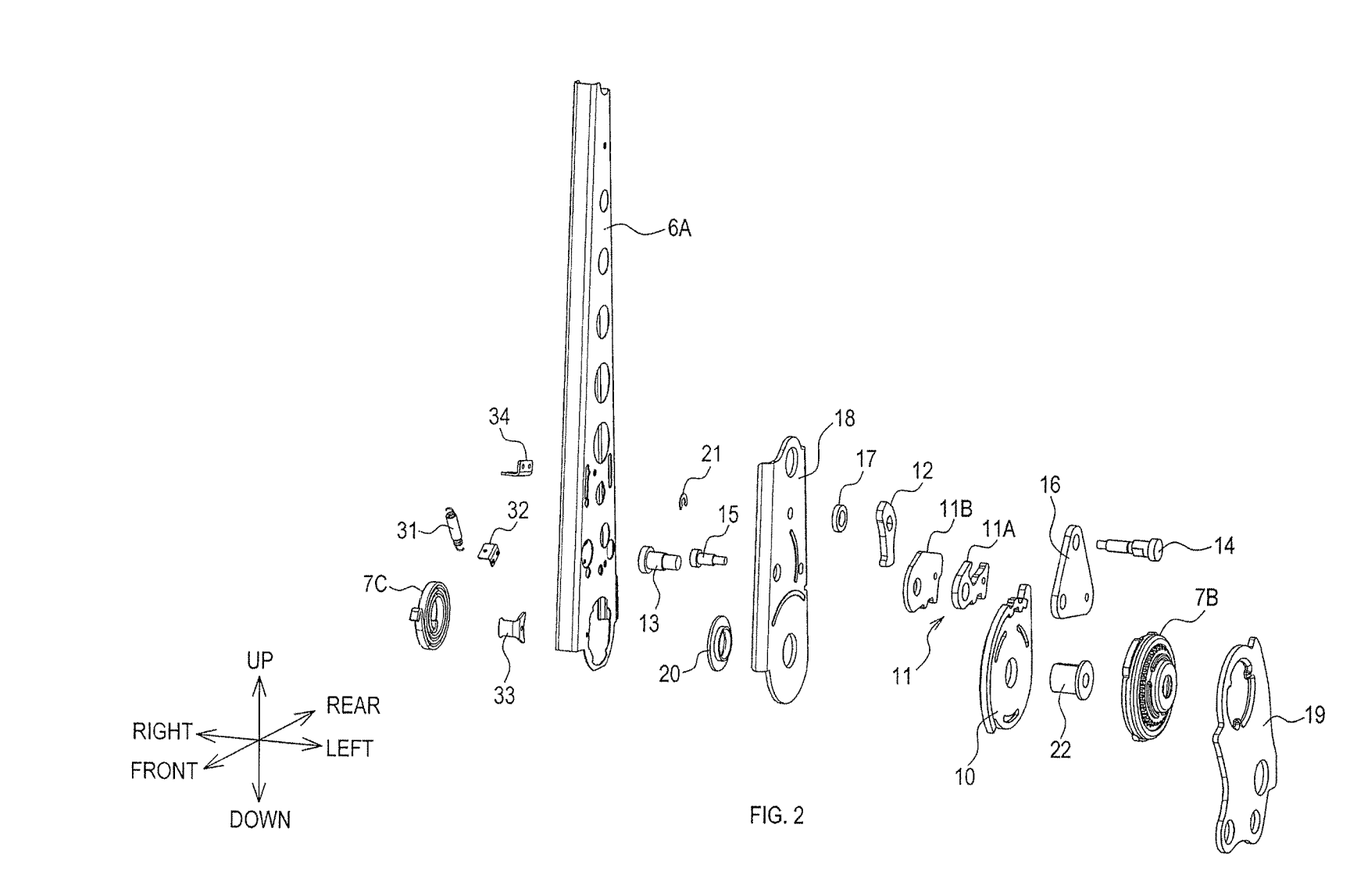
FIG. 2 is a schematic exploded perspective view of a recliner and a walk-in mechanism in the conveyance seat of FIG. 1.

The conveyance seat 1 further comprises two recliners 7 and 8 (left recliner 7 and right recliner 8) along the width axis of the conveyance seat 1 as shown in FIG. 1, and a walk-in mechanism that comprises a tilting member 10, an engagement member 11, a locking member 12, and other components as shown in FIG. 2.

The conveyance seat 1 in the present embodiment is used as, for example, a passenger seat of a passenger car and a rear seat for the second row in a three-row seater car. In the explanations and references to the drawings hereinafter, directions are defined in relation to the conveyance seat 1 that is assembled to a conveyance (vehicle).

<Back Frame>

As shown in FIG. 1, the back frame 6 comprises two side frames 6A and 6B (left side frame 6A and right side frame 6B), an upper panel 6C, and a lower panel 6D.

The two side frames 6A and 6B each extend vertically and are disposed separately along the width axis of the seat (seat-width axis). In the present embodiment, the seat-width axis corresponds to the left-right axis of the vehicle.

The recliners 7 and 8 are disposed in the lower side of the two side frames 6A and 6B respectively. The two recliners 7 and 8 each comprise a reclining function that controls pivoting movement of the seatback 3, in other words, of the back frame 6. In addition to the recliner 7, the walk-in mechanism shown in FIG. 2 is also attached to the lower side of the left side frame 6A.

The upper panel 6C extends along the seat-width axis and couples the upper ends of the two side frames 6A and 6B. The upper panel 6C is a panel-shaped frame that has, for example, a substantially C-shaped cross section taken perpendicular to the extending direction of the upper panel 6C.

The lower panel 6D extends along the seat-width axis and couples the lower ends of the two side frames 6A and 6B. The lower panel 6D is a panel-shaped member that has, for example, a substantially C-shaped or J-shaped cross section taken perpendicular to the extending direction of the lower panel 6D.

<Recliner>

The two recliners 7 and 8 each comprise a locking mechanism 7B, a pivoting force generation mechanism 7C, and other components as shown in FIG. 2. The locking mechanism 7B shifts from a locked state, in which the pivoting movement of the back frame 6 is inhibited, to a released state, in which the locked state is released.

The pivoting force generation mechanism 7C is for generating a pivoting force to cause the back frame 6 to pivot at least in the released state. An electric motor and a spiral torsion spring are examples of the pivoting force generation mechanism 7C.

In the two recliners 7 and 8, the locking mechanism 7B functions when a reclining lever 7A, which is attached to a side face of the seat cushion 2, is manipulated. Far example, if the pivoting force generation mechanism 7C is a spiral torsion spring, the back frame 6 tends to tilt forward (to a folded down position) due to a pivoting force generated by the pivoting force generation mechanism 7C when the locking mechanism 7B is placed in the released state. However, if the occupant pushes the seatback 3 rearward against the pivoting force (from the folded down position), the back frame 6 and the seatback 3 are caused to pivot rearward. Meanwhile, if the pivoting force generation mechanism 7C is an electric motor, the electric motor starts rotating at the same time as the locking mechanism 7B is placed in the released state and causes the seatback 3 to pivot forward or rearward.

<Walk-in Mechanism>

As shown in FIG. 2, the walk-in mechanism comprises the tilting member 10, the engagement member 11, and the locking member 12.

(Tilting Member)

The tilting member 10 has a plate-like shape and is for transmitting the pivoting force generated in the pivoting force generation mechanism 7C of the recliner 7 to the back frame 6. The tilting member 10 is also referred to as a ratchet plate or a rotating cam.

Figure 3:
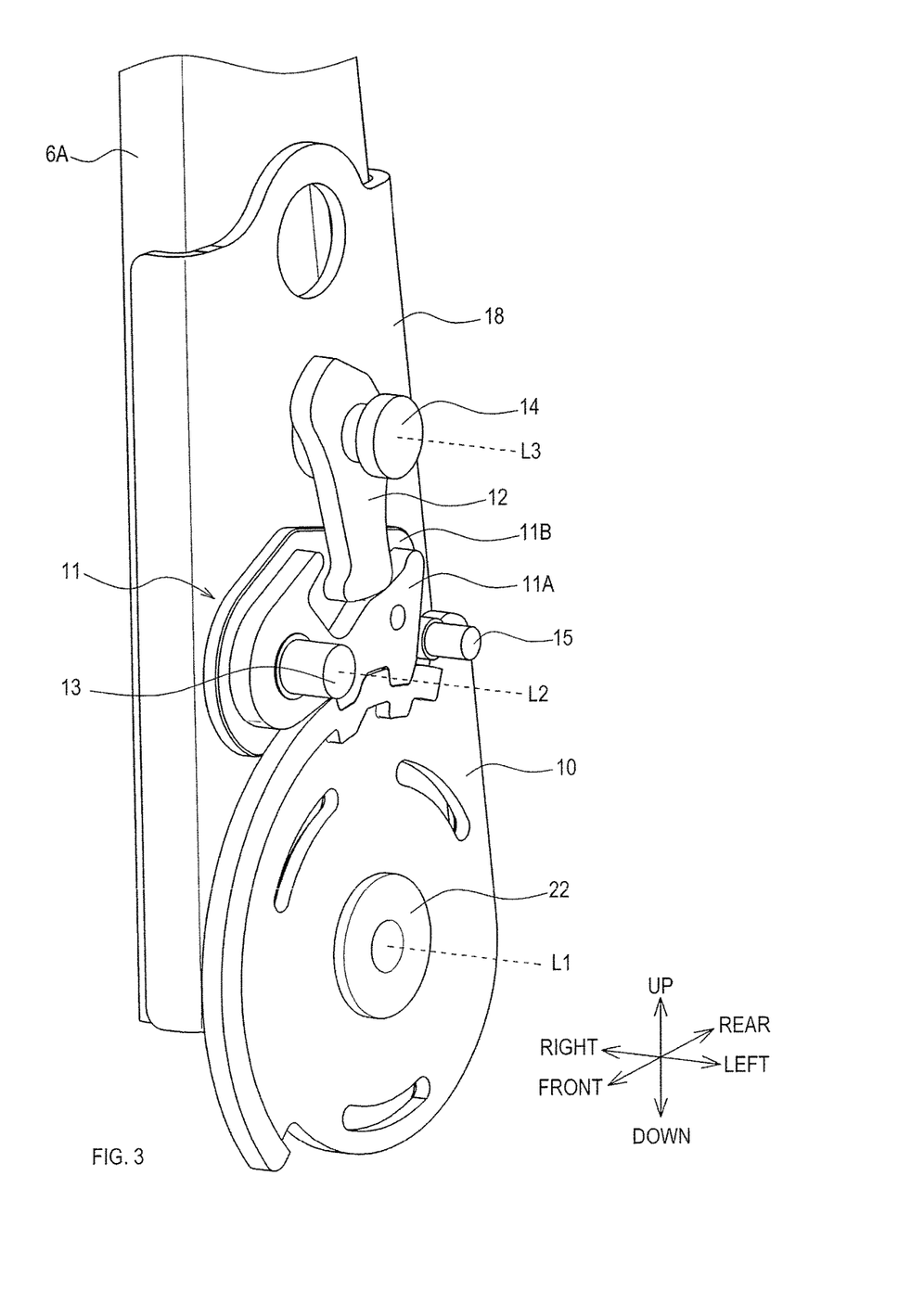
FIG. 3 is a schematic perspective view showing the positional relationship between a tilting member, an engagement member, and a locking member in the conveyance seat of FIG. 1.

As shown in FIG. 3, the tilting member 10 is configured to be pivotable relative to the hack frame 6 about a pivot axis L1 of the back frame 6. In other words, the pivot axis of the tilting member 10 coincides with the pivot axis L1 of the back frame 6. The tilting member 10 is coupled to the pivoting force generation mechanism 7C of the recliner 7 to transmit a pivoting force.

Figure 4:
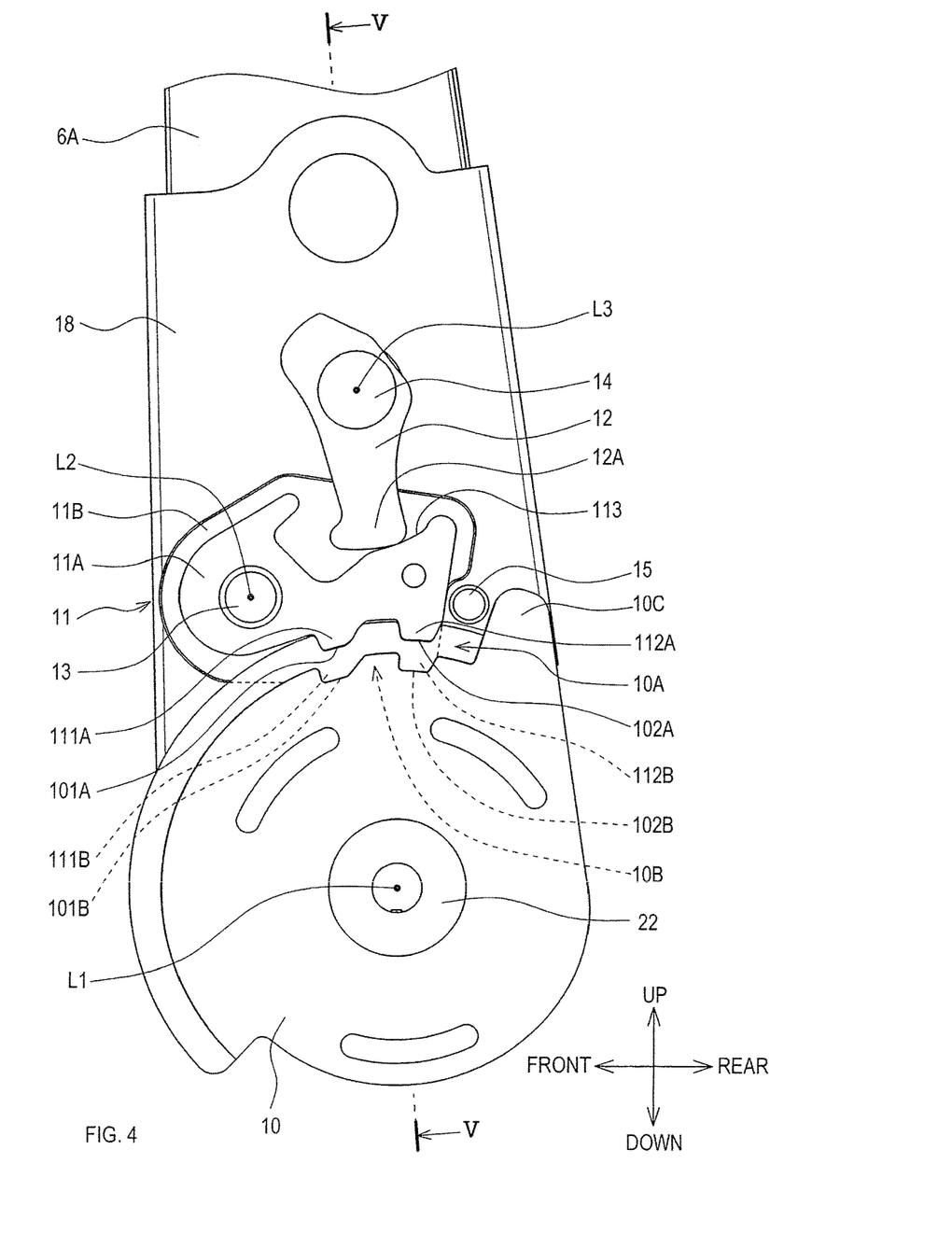
FIG. 4 is a schematic left side view showing the positional relationship between the tilting member, the engagement member, and the locking member in the conveyance seat of FIG. 1.
Figure 6:
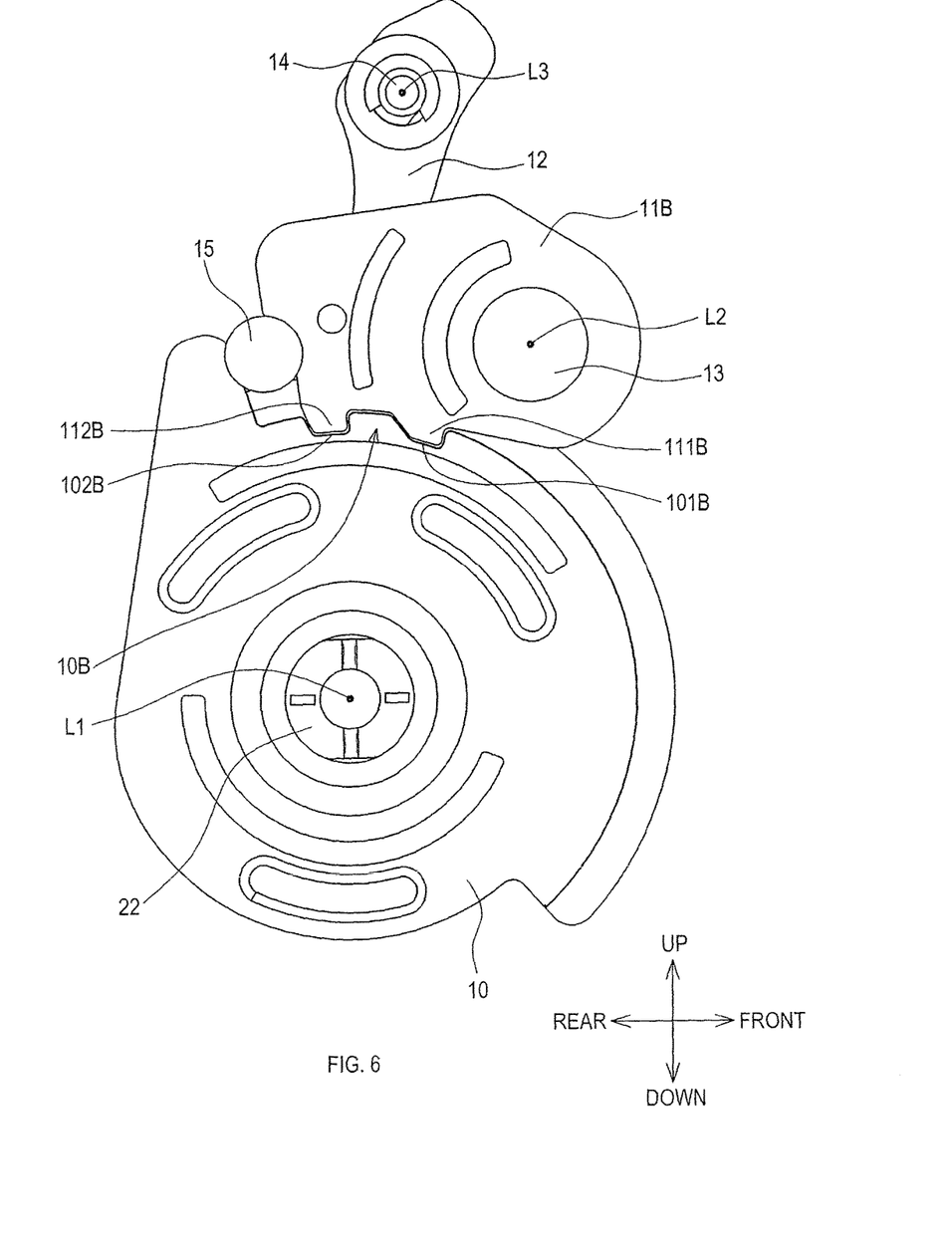
FIG. 6 is a schematic right side view showing the positional relationship between the tilting member, the engagement member, and the locking member in the conveyance seat of FIG. 1.

More specifically, as shown in FIG. 3, FIG. 4, and FIG. 6, the tilting member 10 has a substantially disk-like shape and comprises, in its central area, a through hole with a pivot axis L1. A bushing nut 22 that is configured to be coupled to the locking mechanism 7B and other components are inserted in this through hole.

In a seat-mode, in which the conveyance seat 1 is not folded down, the tilting member 10 comprises, in its upper end, a first receiving member 10A and a second receiving member 10B that are engageable with engagement portions of the engagement member 11. The engagement portions will be explained later. The tilting member 10 also comprises, on the rear side of its upper end (in other words, on the side of its upper end opposite the tilting direction of the back frame 6), a tongue-shaped portion 10C that extends upwardly and abuts a stopper pin 15.

The first receiving member 10A comprises depressions 101A and 102A that are engageable with a first engagement portion 11A of the engagement member 11. The second receiving member 10B comprises depressions 101B and 102B that are engageable with a second engagement portion 11B of the engagement member 11.

The first receiving member 10A and the second receiving member 10B are offset from each other along the pivot axis L1 of the back frame 6. Specifically, as shown in FIG. 5, the first receiving member 10A is situated more outwardly (in the present embodiment, further to the left side) of the back frame 6 than the second receiving member 10B is.

In the present embodiment, as shown in FIG. 4, the first receiving member 10A is situated farther from the pivot axis L1 of the tilting member 10 than the second receiving member 10B is. In other words, the depressions 101B and 102B of the second receiving member 10B are situated closer to the pivot axis L1 of the tilting member 10, that is, more radially inwardly in the tilting member 10, than the depressions 101A and 102A of the first receiving member 10A are.

In the present embodiment, the first receiving member 10A and the second receiving member 10B are formed by half-blanking a single sheet material. More specifically, the second receiving member 10B is formed by half-blanking, along the thickness direction, the upper end of the tilting member 10, where the first receiving member 10A is formed, for a constant distance from the outer edge of the tilting member 10. The tilting member 10 is thus formed from a single sheet material whose area where the first receiving member 10A is formed is pressed along the thickness.

Figure 5:
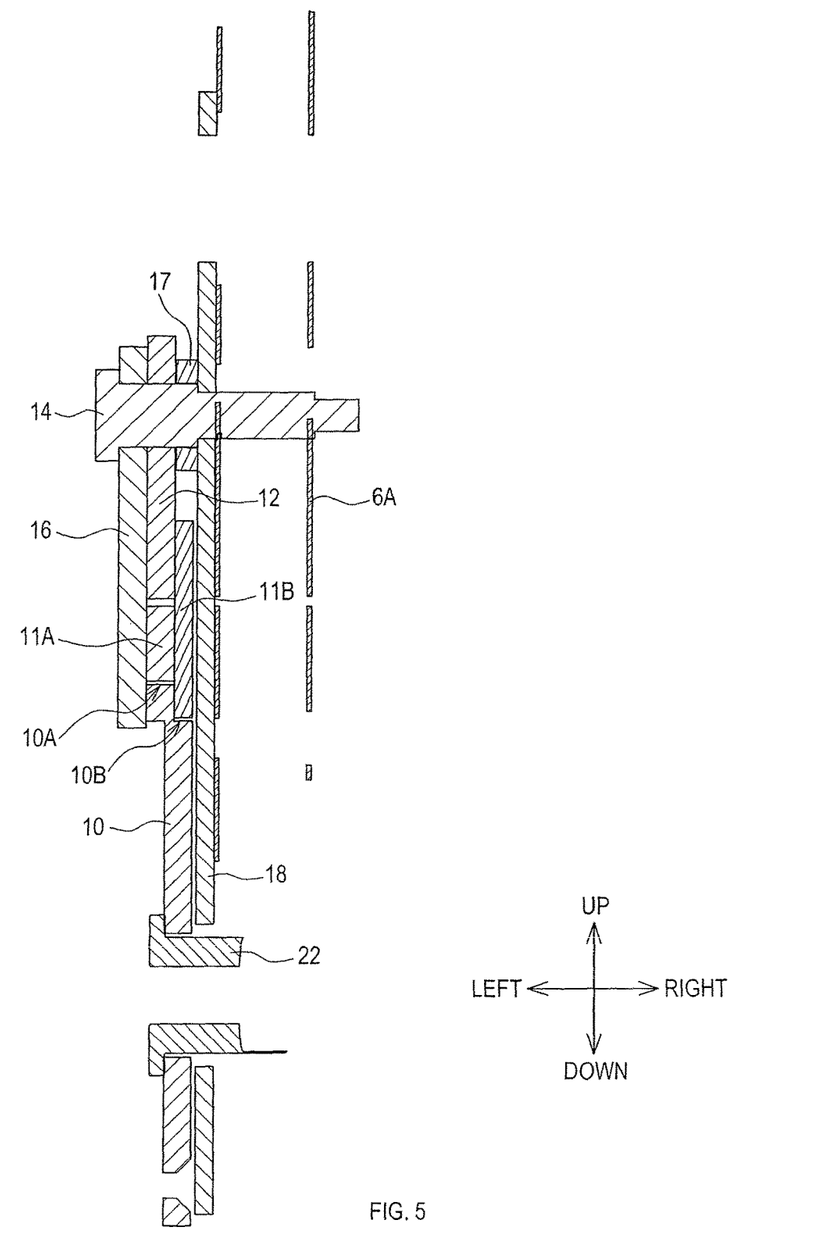
FIG. 5 is a schematic sectional view: taken along line V-V of FIG. 4.

Since the first receiving member 10A and the second receiving member 10B are formed by half-blanking a sheet material, the thickness of the second receiving member 10B is less than the thickness of the first receiving member 10A as shown in FIG. 5. This is for the reason that, while the thickness of the first receiving member 10A is equal to the thickness of the original sheet material, which is the thickness before the half-blanking, the thickness of the second receiving member 10B is thinner than the thickness of the original sheet material for the thickness of the connected part sharing with the first receiving member 10A. Thus, the second engagement portion 11B (to engage with the second receiving member 10B) is thinner than the first engagement portion 11A.

The tongue-shaped portion 10C restricts the rearward pivoting movement of the back frame 6 by abutting the stopper pin 15, which is fixed to the side frame 6A and comes into contact from the front, when the engagement member 11 is placed in a non-engaged position and disengaged with the tilting member 10. When the engagement member 11 is placed in an engaged position and engaged with the tilting member 10, the stopper pin 15 is situated between the engagement member 11 and the tongue-shaped portion 10C and spaced apart from the tongue-shaped portion 10C.

(Engagement Member)

As shown in the drawings, for example, FIG. 2 and FIG. 3, the engagement member 11 has a plate-like shape and comprises the first engagement portion 11A, and the second engagement portion 11B. The engagement member 11 is also referred to as a pawl.

The engagement member 11 is coupled to the side frame 6A (in other words, to the back frame 6) with a coupling pin 13 (with a pivot axis L2) and displaceable between the engaged position, where the engagement member 11 is engaged with the tilting member 10, and a non-engaged position, where the engagement of the engagement member 11 with the tilting member 10 is released.

The engagement member 11 is arranged so that it overlaps, in its thickness direction, with the tilting member 10 and also arranged so that the plate surfaces of the engagement member 11 and the tilting member 10 are parallel to each other. The engagement member 11 is configured to be pivotable about a pivot axis L2, which is the central axis of the coupling pin 13. The pivot axis L2 of the engagement member 11 is parallel to the pivot axis L1 of the back frame 6. The engagement member 11 is retained in the non-engaged position by an elastic force from an elastic element and displaced to the engaged position by displacement of the locking member 12, which will be explained later.

As shown in FIG. 5, the engagement member 11 comprises the first engagement portion 11A and the second engagement portion 11B that are offset from each other along the pivot axis L2 (in other words, along the thickness, or left-right direction).

As shown in FIG. 4, the first engagement portion 11A comprises a first projection 111A that is engageable with the first depression 101A of the first receiving member 10A, and a second projection 112A (tight-fit projection 112A) that is engageable with the second depression 102A (tight-fit depression 102A). In addition, as shown in FIG. 6, the second engagement portion 11B comprises a third projection 111B (first slanted projection 111B) that is engageable with the third depression 101B (first slanted depression 101B) of the second receiving member 10B, and a fourth projection 112B (second slanted projection 112B) that is engageable with the fourth depression 102B (second slanted depression 102B).

In the present embodiment, the first engagement portion 11A and the second engagement portion 11B both have a plate-like shape. Since surfaces of the first engagement portion 11A and the second engagement portion 11B are joined by, for example, welding, the first engagement portion 11A and the second engagement portion 11B are displaced collectively. In addition, the first engagement portion 11A and the second engagement portion 11B pivot about their common pivot axis L2.

Each of the first engagement portion 11A and the second engagement portion 11B comprises projections in one end, which is the lower end when these engagement portions 11A and 11B are placed in the engaged position relative to the tilting member 10. The first engagement portion 11A and the second engagement portion 11B are displaced to be in the non-engaged position, where the engagement of the engagement member 11 with the tilting member 10 is released, by pivoting about the pivot axis L2 such that the projections are moved upwardly and situated away from the tilting member 10.

As shown in FIG. 5, the thickness of the first engagement portion 11A is the same as the thickness of the first receiving member 10A. Likewise, the thickness of the second engagement portion 11B is the same as the thickness of the second receiving member 10B. Accordingly, the thickness of the first engagement portion 11A is greater than the thickness of the second engagement portion 11B.

As shown in the drawings, for example, FIG. 3 and FIG. 4, the area of the second engagement portion 11B is greater than the area of the first engagement portion 11A in the planar view and side views. Specifically, as viewed along the pivot axis L2, the outer edge of the second engagement portion 11B is situated more externally than the outer edge of the first engagement portion 11A. In the engagement member 11, the projections 111B and 112B of the second engagement portion 11B are therefore situated closer to the tilting member 10 than the projections 111A and 112A of the first engagement portion 11A are.

As shown in FIG. 4, the first engagement portion 11A comprises, on the opposite side of where the projections 111A and 112A are disposed, a sliding contact portion 113 that has an inwardly curved contour and engages with the locking member 12. The inward curve of the sliding contact portion 113 becomes deeper towards the pivot axis L2. Meanwhile, the second engagement portion 11B does not comprise such a sliding contact portion; the edge of the second engagement portion 11B on the opposite side of the projections 111B and 112B is smooth.

(Relationship between Projections and Depressions)

Figure 7:
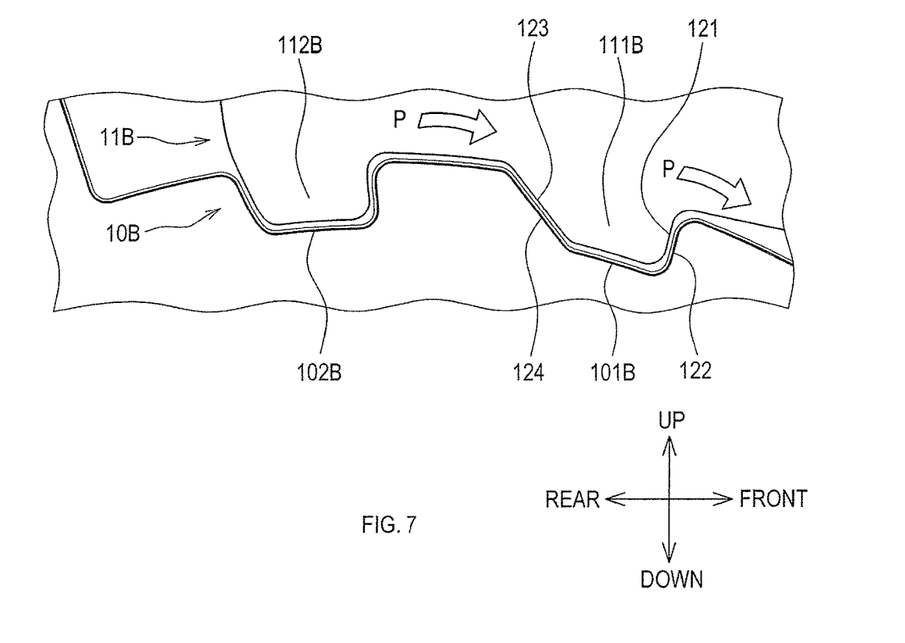
FIG. 7 is a schematic and partial enlarged view of the engagement area of the tilting member and the engagement member in FIG. 6.

In the present embodiment, as shown in FIG. 7, the first slanted projection 111B, which is situated in the front of the second engagement portion 11B, and comprises a first side wall 121. The first side wall 121 is the front-side wall of the first slanted projection 111B in a frontward pivoting direction P of the back frame 6. The first slanted depression 101B that engages with the first slanted projection 111B comprises a second side wall 122 that faces the first side wall 121. The first side wall 121 and the second side wall 122 are separated from each other when the engagement member 11 is placed in the engaged position. Also, each of the first side wall 121 and the second side wall 122 comprises an upper end and a lower end; the upper end is situated farther from the pivot axis of the back frame than the lower end is. The first side wall 121 and the second side wall 122 each slant such that the lower end is situated more frontward than the upper end is in the frontward pivoting direction P of the hack frame. "The frontward pivoting direction P of the hack frame 6" is the direction to fold down the hack frame 6 forward. Therefore, the frontward pivoting direction P is a direction towards the front side of the vehicle in the present embodiment.

More specifically, in the engaged state, the first side wall 121 and the second side wall 122 are designed to be substantially parallel to each other in their central area in the slanting direction (in other words, in the vertically downward direction) of the first slanted projection 111B. In addition, the lower ends of the first side wall 121 and the second side wall 122 are curved to be coupled to the bottom walls of the first slanted projection 111B and the first slanted depression 101B respectively. The radius of curvature of the curved portion in the first side wall 121 is smaller than the radius of curvature of the curved portion in the second side wall 122. The clearance between the first side wall 121 and the second side wall 122 therefore has a greater width in these curved portions than the clearance in the central area in the vertical direction.

The first slanted projection 111B and the first slanted depression 101B also have a clearance between their bottom walls. The first slanted projection 111B comprises a third side wall 123 that is a side wall (rear-side wall) opposite the first side wall 121. The first slanted depression 101B comprises a fourth side wall 124 that is a side wall opposite the second side wall 122. Each of the third side wall 123 and the fourth side wall 124 also comprises an upper end and a lower end similarly to the first side wall 121 and the second side wall 122. Each of the third side wall 123 and the fourth side wall 124 also slants such that the lower end is situated more frontward than the upper end is in the frontward pivoting direction P of the back frame. The slant angle of the third side wall 123 and the fourth side wall 124 towards the pivot axis L1 (in other words, the downward slant angle) is greater than the downward slant angle of the first side wall 121 and the second side wall 122.

Also, the positional relationship between the second slanted projection 112B in the rear side of the second engagement portion 11B and the second slanted depression 102B that engages with the second slanted projection 112B is the same as the aforementioned positional relationship between the first slanted projection 111B and the first slanted depression 101B.

In the present embodiment, the tight-fit depression. 102A is one of the depressions in the tilting member 10 and is situated farthest from the pivot axis L2 of the engagement member 11. As shown in FIG. 4, there is no clearance in the pivoting directions of the back frame 6 between the tight-fit depression 102A and the tight-fit projection 112A, which engages with the tight-fit depression 102A, when the engagement member 11 is placed in the engaged position. In other words, there is no clearance, and thus no play, between facing side walls of the tight-fit depression 102A and the tight-fit projection 112A.

The tight-fit depression 102A is one of the depressions in the first receiving member 10A. The first engagement portion 11A is a "locked engagement portion" that the locking member 12 abuts in the pivoting direction of the locking member 12 when the locking member 12 is placed in the locked position: In addition, the first engagement portion 11A is also a "thick engagement portion" whose sheet thickness is greater than the sheet thickness of the second engagement portion 11B.

More specifically, in the present embodiment, there is no clearance, in the pivoting directions of the back frame 6, between the tight-fit depression 102A, which is situated farthest from the pivot axis L2 of the locked engagement portion or the thick engagement portion, and the tight-fit projection 112A that engages with the tight-fit depression 102A.

What is meant by "a depression that is situated farthest from the pivot axis L2" is a depression that has the greatest shortest distance between its farthest side wall and the pivot axis L2. The farthest side wall is one of the two opposing side walls of a depression and is situated the farther of the two opposing side walls from the pivot axis L2. In addition, there may be a clearance between the bottom walls of the tight-fit depression 102A and the tight-fit projection 112A.

(Locking Member)

The locking member 12 has a plate-like shape and is configured for locking the engagement member 11 in the engaged position. The locking member 12 is coupled to the side frame 6A (in other words, to the back frame 6) with a coupling pin 14 and is displaceable between a locked position, where the engagement member 11 is locked, and an unlocked position, where the engagement member 11 is not locked. The locking member 12 has a substantially belt-like, flat, and rectangular shape with rounded corners. The coupling pin 14 is inserted in the first end of the locking member 12, and a cam 12A is formed in the second end of the locking member 12.

As shown in FIG. 5, the locking member 12 is arranged to overlap, in its thickness direction, with the tilting member 10 and the first engagement portion 11A of the engagement member 11 (but not the second engagement portion 11B), and is also arranged so that the plate surface of the locking member 12 is parallel to the plate surfaces of the tilting member 10 and the engagement member 11. The left surface of locking member 12 is coplanar with the left surface of first engagement portion 11A and coplanar with the left surface of first receiving member 10A, the right surface of locking member 12 is coplanar with the right surface of first engagement portion 11A and with the right surface of first receiving member 10A. The locking member 12 is configured to be pivotable about a pivot axis L3, which is the central axis of the coupling pin 14. The locking member 12 is retained in the locked position by an elastic force from an elastic element and displaced to the unlocked position by wire manipulation.

In the seat-mode as shown in the drawings, for example, FIG. 4, the locking member 12 is placed in the locked position and is arranged so that the longitudinal axis of the locking member 12 substantially coincides with the vertical axis. In this seat-mode, the cam 12A restricts the pivoting movement of the engagement member 11 by abutting a shallow curved area of the sliding contact portion 113 of the first engagement portion 11A (that is, the rear area of the sliding contact portion 113). When the cam 12A reaches, by sliding, to a deep curved area of the sliding contact portion 113 (that is, the front area of the sliding contact portion 113) in response to pivoting of the locking member 12, the engagement member 11 is released from the lock by the cam 12A and is enabled to pivot.

In the present embodiment, as shown in FIG. 4 and FIG. 5, the locking member 12 abuts, in its pivoting direction, only the sliding contact portion 113 of the first engagement portion 11A when the locking member 12 is placed in the locked position. The locking member 12 does not abut or contact, in its pivoting direction, an upper surface of the second engagement portion 11B when the locking member 12 is placed in the locked position. However, the locking member 12 may abut, in its thickness direction, the left side vertical surface of the second engagement portion 11B.

(Other Configurations)

As shown in FIG. 2, the conveyance seat 1 comprises a restricting member 16; a collar 17; a first plate 18; a second plate 19; a bushing 20; an E-ring 21; a spring 31; a spring-bracket 32; a spiral-bracket 33; and a wire-bracket 34, as the components configuring the walk-in mechanism.

The restricting member 16 is combined with the collar 17 and coupled to the side frame 6A with the coupling pin 14. The restricting member 16 is a cover member that has a plate-like shape and covers the locking member 12 and the engagement member 11. Displacement of the locking member 12 and the engagement member 11 along the seat-width axis is restricted by the restricting member 16.

The spring 31 is disposed via the spring-bracket 32 in the opposite side of the locking member 12 across the side frame 6A. The spring 31 exerts an elastic force to retain the locking member 12 in the locked position. Specifically, the spring 31 has its one end fixed to an arm (not shown) that is configured to be coupled to the locking member 12. One end of the arm is coupled to one end of a wire such as a control cable. This wire is coupled to a walk-in lever 9, which is shown in FIG. 1, via the wire-bracket 34.

[1-2. Movement of Walk-in Mechanism]

Hereinafter, movement of the walk-in mechanism in the conveyance seat 1 will be explained.

First, a shift from the seat-mode to a walk-in-mode (also known as a folding-down-mode) is as described below.

As shown in FIG. 3 and FIG. 4, the locking member 12 is placed in the locked position, and the engagement member 11 is placed in the engaged position in the seat-mode. In this seat-mode, a pivoting force generated in the pivoting force generation mechanism 7C in the recliner 7 is transmitted to the back frame 6 via the tilting member 10 and the engagement member 11. The tilting member 10 and the back frame 6 therefore collectively pivot relative to the cushion frame 5.

When the walk-in lever 9 is manipulated in the seat-mode, the locking member 12 is caused to pivot by a tension of the wire and is displaced to the unlocked position; and concurrently, the engagement member 11 is caused to pivot by an elastic force from an elastic element to the non-engaged position. This displacement interrupts a transmitting path of the pivoting force from the pivoting force generation mechanism 7C to the back frame 6. In addition, since the side frame 6A is made pivotable relative to the tilting member 10, folding down of the seat is enabled notwithstanding that the locking mechanism 7B in each of the recliners 7 and 8 is placed in the locked state. By tilting the back frame 6 and the seatback 3 forward in this state, the mode is shifted to the walk-in-mode.

Next, the mode is shifted from the walk-in-mode to the seat-mode by pivoting and raising the back frame 6 and the seatback 3. By raising the back frame 6, the engagement member 11 is caused to slide along the outer circumference of the tilting member 10 and displaced to the engaged position; and concurrently, the locking member 12 is displaced to the locked position.

[1-3. Effect]

According to the embodiment described above, the following effects can be obtained.

(1a) The first side wall 121 of the first slanted projection 111B and the second side wall 122 of the first slanted depression 101B are separated from each other. Each of the first side wall 121 and the second side wall 122 comprises an upper end and a lower end; the upper end is situated farther from the pivot axis of the back frame than the lower end is. Also, the first side wall 121 and the second side wall 122 each slant such that the lower end is situated more frontward than the upper end is in the frontward pivoting direction P of the back frame 6. This configuration creates a clearance between the first slanted projection 111B and the first slanted depression 101B in the engaged position. When a pivoting force is applied to the back frame 6 in the engaged state, this clearance helps the lower end of the first side wall 121 of the first slanted projection 111B to enter the second side wall 122, as if to penetrate (forcing a way) into the lower end of the second side wall 122 that is near a bottom surface of the first slanted depression 101B. As a consequence, the first slanted projection 111B is subjected to a stress in a direction to prevent the first slanted projection 111B from becoming disengaged from the first slanted depression 101B. This results in increasing the engagement force between the engagement member 11 and the tilting member 10.

(1b) There is no clearance, in the pivoting direction of the back frame 6, between the tight-fit projection 112A and the tight-fit depression 102A that are situated farthest from the pivot axis L2 of the engagement member 11. The tight-fit depression 102A and the tight-fit projection 112A are therefore the most likely components to be incorrectly positioned at the time of engagement, and thus required to have highly controlled positioning and high accuracy in shaping. Accordingly, an increase in precision of the engagement between the tight-fit depression 102A and the tight-fit projection 112A takes priority over engagements of other depressions and projections in order to minimize errors in designing the tight-fit depression 102A and the tight-fit projection 112A. This then results in enabling an increase in precision of engagement between the engagement member 11 and the tilting member 10.

(1c) One tilting member 10 can comprise two receiving members, namely the first receiving member 10A and the second receiving member 10B, and engage with two engagement portions of the engagement member 11, namely the first engagement portion 11A and the second engagement portion 11B. This can reduce the number of components while enhancing the engagement force between the engagement member 11 and the tilting member 10.

In addition, the first engagement portion 11A and the second engagement portion 11B are offset from each other along the pivot axis. This offset arrangement makes the distance between the most distant two projections shorter than that in an arrangement that has a plurality of projections aligned, at the same point, across the pivot axis. Consequently, precision of engagement can be enhanced.

(1d) The first slanted projection 11B and the second slanted projection 112B are disposed in the second engagement portion 11B that is situated close to the pivot axis of the tilting member 10. This can further improve the aforementioned effect of increasing the engagement force by a clearance between the first side wall 121 and the second side wall 122.

(1e) The first engagement portion 11A and the second engagement portion 11B are collectively displaced and simultaneously engaged with the tilting member 10. This can reduce differences in the degree of engagement, and thus can increase reliability of the walk-in mechanism.

2. Other Embodiments

Although the embodiment of the present disclosure has been described hereinbefore, the present disclosure may nevertheless be modified to various forms without being limited to the aforementioned embodiment.

(2a) In the conveyance seat 1 in the aforementioned embodiment, the second engagement portion 11B is not always required to comprise a slanted projection; the first engagement portion 11A may alternatively comprise a slanted projection. In addition, the number of slanted projections is not required to be two. There may be one slanted projection, or alternatively, all of the projections may be slanted projections.

(2b) In the conveyance seat 1 in the aforementioned embodiment, there may be a clearance, in the pivoting direction of the back frame 6, between a projection and a depression that is situated most distant from the pivot axis L2 of all the depressions of the engagement member 11. Alternatively, there may be no such clearance between a projection and a depression that is not situated most distant from the pivot axis L2 of all the depressions of the engagement member 11.

(2c) In the conveyance seat 1 in the aforementioned embodiment, the first engagement portion 11A and the second engagement portion 11B are not always required to be displaced collectively. In other words, the first engagement portion 11A and the second engagement portion 11B do not have to be joined and may be configured to be individually pivotable. Alternatively, the first engagement portion 11A and the second engagement portion 11B may be integrally formed by, for example, casting and cutting.

(2d) In the conveyance seat 1 in the aforementioned embodiment, the first receiving member 10A may be situated closer to the pivot axis L1 of the tilting member 10 than the second receiving member 10B is. In addition, the first receiving member 10A and the second receiving member 10B may be situated at the same distance from the pivot axis L1.

The first receiving member 10A and/or the second receiving member 10B of the tilting member 10 may be formed by a method other than press working. In addition, the tilting member 10 is not always required to be formed from a single sheet material; it may be made from two or more materials.

(2e) In the conveyance seat 1 in the aforementioned embodiment, the tilting member 10 may comprise only the first receiving member 10A, and the engagement member 11 may comprise only the first engagement portion 11A. Alternatively, the tilting member 10 may comprise another receiving member in addition to the first receiving member 10A and the second receiving member 10B, and the engagement member 11 may comprise another engagement portion in addition to the first engagement portion 11A and the second engagement portion 11B. In addition, the number of depressions on each of the receiving members and the number of projections in each of the engagement portions may be more or less than two (contrary to FIG. 4). The number of depressions and projections may be three or more each.

(2f) The conveyance seat 1 in the aforementioned embodiment may be utilized as a passenger seat of a passenger car, a seat other than a rear seat for an automobile, or a seat for conveyances other than automobiles such as railway vehicles, vessels, and aircrafts.

(2g) Functions of one element in the aforementioned embodiment may be divided for two or more elements, or functions of two or more elements in the aforementioned embodiment may be incorporated into one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas defined by the languages in the scope of the claims are embodiments of the present disclosure.

What is claimed is:

1. A conveyance seat comprising:
a seat cushion;
a seatback that is pivotable frontward and rearward relative to the seat cushion;
a cushion frame that is a frame of the seat cushion;
a back frame that is a frame of the seatback and is coupled to the cushion frame to be pivotable frontward and rearward relative to the cushion frame;
a tilting member having a plate shape that transmits, to the back frame, pivoting force for pivoting the back frame and is pivotable relative to the back frame about a pivot axis of the back frame;
an engagement member having a plate shape that is coupled to the back frame and displaceable between an engaged position, where the engagement member is engaged with the tilting member, and a non-engaged position, where the engagement of the engagement member with the tilting member is released; and
a locking member having a plate shape that is displaceable between a locked position, where the engagement member is locked in the engaged position, and an unlocked position, where the engagement member is not locked in the engaged position,
the engagement member comprising projections;
the tilting member comprising depressions that are engageable with the projections;
the projections including a slanted projection;
the depressions including a slanted depression that engages with the slanted projection;
the slanted projection comprising a first side wall situated in the frontward pivoting direction of the back frame;
the slanted depression comprising a second side wall that faces the first side wall;
the first side wall being separated from the second side wall when the engagement member is placed in the engaged position;
each of the first side wall and the second side wall comprising an upper end and a lower end, wherein the upper end is situated farther from the pivot axis of the back frame than the lower end is;
the first side wall and the second side wall each slanting such that the lower end is situated more frontward than the upper end is in the frontward pivoting direction of the back frame.

2. The conveyance seat according to claim 1, wherein
the engagement member comprises a first engagement portion and a second engagement portion that are offset from each other along the pivot axis of the back frame;
the projections include a first projection, a second projection, a third projection, and a fourth projection;
the depressions include a first depression, a second depression, a third depression, and a fourth depression;
the first engagement portion comprises the first projection and the second projection;
the second engagement portion comprises the third projection and the fourth projection;
the tilting member comprises a first receiving member and a second receiving member;
the first receiving member comprises the first depression and the second depression that are respectively engageable with the first projection and the second projection; and
the second receiving member comprises the third depression and the fourth depression that are respectively engageable with the third projection and the fourth projection.

3. The conveyance seat according to claim 2, wherein
the first engagement portion and the second engagement portion each have a plate shape and each are configured to be pivotable about an axis that is parallel to a pivot axis of the tilting member;

the locking member is configured to abut the first engagement portion in a pivoting direction of the locking member when the locking member is placed in the locked position;

the first depression or the second depression of the first receiving member is a tight-fit depression that is the most distant depression from a pivot axis of the first engagement portion;

the first projection or the second projection of the first engagement portion is a tight-fit projection that engages with the tight-fit depression; and when the first engagement portion is placed in the engaged position, there is no clearance between the tight-fit depression and the tight-fit projection in the pivoting direction of the back frame.

4. The conveyance seat according to claim 2, wherein the first engagement portion and the second engagement portion each have a plate shape and each are configured to be pivotable about an axis that is parallel to a pivot axis of the tilting member;

a thickness of the first engagement portion is greater than a thickness of the second engagement portion;

the first depression or the second depression of the first receiving member is a tight-fit depression that is the most distant depression from a pivot axis of the first engagement portion;

the first projection or the second projection of the first engagement portion is a tight-fit projection that engages with the tight-fit depression; and when the first engagement portion is placed in the engaged position, there is no clearance between the tight-fit depression and the tight-fit projection in the pivoting direction of the back frame.

5. The conveyance seat according to claim 2, wherein the third depression and the fourth depression of the second receiving member are situated closer to a pivot axis of the tilting member than the first depression and the second depression of the first receiving member are, and the third projection or the fourth projection of the second engagement portion is the slanted projection.

6. The conveyance seat according to claim 2, wherein the first engagement portion and the second engagement portion are configured to be collectively displaced.

7. The conveyance seat according to claim 1, wherein the engagement member is configured to be pivotable about an axis that is parallel to a pivot axis of the tilting member;

the depressions of the tilting member include a tight-fit depression that is the most distant depression from a pivot axis of the engagement member;

the projections of the engagement member include a tight-fit projection that engages with the tight-fit depression; and when the engagement member is placed in the engaged position, there is no clearance between the tight-fit depression and the tight-fit depression in the pivoting direction of the back frame.

* * * * *